United States Patent [19]
Bodmer et al.

[11] Patent Number: 5,536,206
[45] Date of Patent: Jul. 16, 1996

[54] ARTICULATED DUCT FUME COLLECTION AND EXHAUST APPARATUS

[75] Inventors: Michael A. Bodmer, Richardson; David W. Bonham, Mesquite, both of Tex.

[73] Assignee: Airflow Systems, Inc., Dallas, Tex.

[21] Appl. No.: 386,414

[22] Filed: Feb. 10, 1995

[51] Int. Cl.$^6$ ................................................. B08B 15/04
[52] U.S. Cl. .................................................................. 454/65
[58] Field of Search ............................................ 454/63, 65

[56] References Cited

U.S. PATENT DOCUMENTS

| | | |
|---|---|---|
| 1,390,950 | 9/1921 | Avery . |
| 3,818,817 | 6/1974 | Nederman ............................ 454/65 |
| 3,911,954 | 10/1975 | Johnson ................................ 137/615 |
| 4,158,462 | 6/1979 | Coral ..................................... 285/168 |
| 4,259,897 | 4/1981 | Nederman . |
| 4,318,337 | 3/1982 | Wichmann et al. . |
| 4,379,548 | 4/1983 | Boshoven ............................ 266/158 |
| 4,512,245 | 4/1985 | Goldman . |
| 4,540,202 | 9/1985 | Amphoux et al. .................. 285/184 |
| 4,541,896 | 9/1985 | Banning .............................. 162/363 |
| 4,699,046 | 10/1987 | Bellieni . |
| 4,860,644 | 8/1989 | Kohl et al. ............................ 454/65 |
| 5,159,737 | 11/1992 | Kimura et al. ....................... 15/314 |
| 5,211,602 | 5/1993 | Holmgren ............................ 454/63 |

FOREIGN PATENT DOCUMENTS

| | | | |
|---|---|---|---|
| 2525930 | 11/1983 | France .................................... 454/65 |
| 611571 | 11/1948 | United Kingdom ................... 454/65 |
| 2046858 | 11/1979 | United Kingdom ................... 454/65 |

*Primary Examiner*—Harold Joyce
*Attorney, Agent, or Firm*—Dennis T. Griggs

[57] ABSTRACT

A fume and/or dust collection apparatus adapted for concentrated sources of fumes and particulate matter includes an elongated duct connected at one end to a vacuum source and adapted to be supported by a wall bracket or a portable console and a fume collection hood at the opposite end of the duct. One or more flexible joints are interposed in the duct between the support bracket and the hood. Joint support mechanism for each flexible joint includes opposed pairs of pivotally connected arms which interconnect rigid sections of duct on each side of the flexible joint. The connections between the arms of each set include a friction clutch and ratchet and pawl mechanism which permits free movement of the flexible joints in a direction which is opposite that which the hood would move under its own weight while providing for counterbalancing the weight of the apparatus distal of the support bracket and a positive force required to position the hood precisely in the other direction. The friction clutch and ratchet and pawl mechanism is interposed between the arms of each set of arms about a pivot connection formed by a bolt and nut assembly, which may be adjusted to change the friction force required to slip the clutches of each joint support mechanism.

22 Claims, 3 Drawing Sheets

ARTICULATED DUCT FUME COLLECTION AND EXHAUST APPARATUS

FIELD OF THE INVENTION

The present invention is related generally to fume collection and exhaust apparatus which can be positioned adjacent to or, when desired, quickly removed from a source of fumes or dust.

BACKGROUND OF THE INVENTION

The ever increasing need to collect toxic and noxious fumes, vapors, mists and dust generated during various commercial and industrial processes has brought on the development of several types of collection and exhaust systems. Systems which utilize fixed hoods to collect fumes, mists, vapors, dust and other particulate matter, from a relatively large work area or systems which collect the atmospheric contents of an entire room are expensive to operate and require the movement and treatment of large amounts of air. Many industrial processes have relatively small sources of undesirable fumes, mists, dust and other airborne particles and the like. Operations such as soldering, welding, various machining operations and certain chemical processes, such as adhesive and paint application, generate fumes, mists, vapors and dust from rather localized or point sources. Accordingly, the desire to minimize the amount of air moved and treated to collect such undesirable fumes, mists, vapors and dust has led to the development of point or localized source dust collection and exhaust devices which include a hood or inlet port into the device which may be positioned relatively close to the source of airborne particulates to be collected and thus minimizes the amount of atmospheric air handled and treated.

DESCRIPTION OF THE PRIOR ART

The desire to minimize the amount of air handled in removing fumes and dust from rather localized sources has resulted in the development of certain types of articulated duct-type fume collection and exhaust devices. Typically, these devices include an articulated duct having one or more flexible joints at which a support mechanism is provided to aid in stabilizing the interconnected duct sections. One conventional support mechanism comprises various arrangements of tension or torsion coil springs for counteracting the weight and associated torque of the duct assembly distal of a flexible joint. However, such conventional spring arrangements are bulky and not easily adjustable to balance the weight of the duct assembly. It has also been proposed to place the joint support mechanism inside the duct; however, that arrangement exposes the mechanism to the corrosive fumes and dust being collected and transported by the device which may be detrimental to the joint mechanism, and, of course, access to the joint support mechanism for adjustment or repair is severely restricted.

Another limitation of conventional fume collection duct or tube support mechanisms relates to the inability to provide appropriate apparatus which can support at least part of the weight of the duct assembly distal of the flexible joint and also permit easy positioning of the duct and its associated fume collection hood in proximity to the work area or source of fumes. Prior art support mechanisms have also lacked means operable such that the hood and duct assembly may be quickly and easily moved, at least momentarily, out of proximity to the work area when the work has been completed or when the operator must have immediate access to the work and the collection hood is in the way.

Still further, there is a continuing interest in providing an articulated duct-type fume collection and exhaust apparatus which includes mechanism which is compact, mechanically uncomplicated and operable to support the apparatus and which provides for precise positioning of the duct and its associated collection hood in a working position and removal of the duct and hood from the working position without requiring substantial operator effort. It is to these ends that the present invention has been developed.

SUMMARY OF THE INVENTION

The present invention provides an improved articulated duct fume collection and exhaust apparatus, particularly adapted for collecting fumes, mists, vapors and dust and other airborne particulates from a rather localized industrial source.

In accordance with one important aspect of the present invention, an articulated duct fume collection and exhaust apparatus is provided wherein a fume and dust transport duct or tube is provided with one or more flexible joints to permit bending the duct or tube to position a collection hood in proximity to a source of fumes or dust and wherein the flexible joint or joints are provided with an improved mechanism for supporting the joint and for positioning the jointed sections of duct, including the hood, in an improved manner. The articulated apparatus is advantageously provided with joint support mechanism which may be operable to support part or all of the weight of the apparatus distal of the joint while providing for easy movement of the duct assembly into a working position under rather precise control so that the collection hood can be easily and positively positioned. Still further, the joint support mechanism also provides for easy and quick movement of the hood and duct assembly away from the work area, when desired.

The desired movement of the duct and hood assembly is provided by a combination ratchet coupling and friction clutch interconnecting two arms of the joint support mechanism and providing for positive and precise control of movement of the duct in one direction under slippage of the friction clutch, while also permitting quick and relatively effortless movement of the duct and hood assembly in the opposite direction thanks to release of the ratchet coupling by a manually operable pawl.

In accordance with yet a further aspect of the present invention, a joint support mechanism is provided for an articulated duct fume exhaust apparatus wherein a unique combined ratchet coupling and friction clutch is provided on one or both sides of a flexible joint between sections of the duct. The combined ratchet coupling and friction clutch is compact and mechanically reliable. The friction clutch may be easily adjusted and the ratchet coupling may be easily inspected or manually released, if desired. The joint support mechanism may be utilized on one or more joints of a plural jointed duct assembly.

Still further, the present invention provides an improved easily movable, articulated duct assembly for a fume collection and exhaust apparatus wherein a combination of one or more friction clutch joint support mechanisms and support spring means are arranged in such a way as to provide an apparatus which has improved movement and support characteristics.

Those skilled in the art will recognize the above-mentioned features and advantages of the present invention

DETAILED DESCRIPTION OF THE PREFERRED EMBODIMENT

Figure 1:
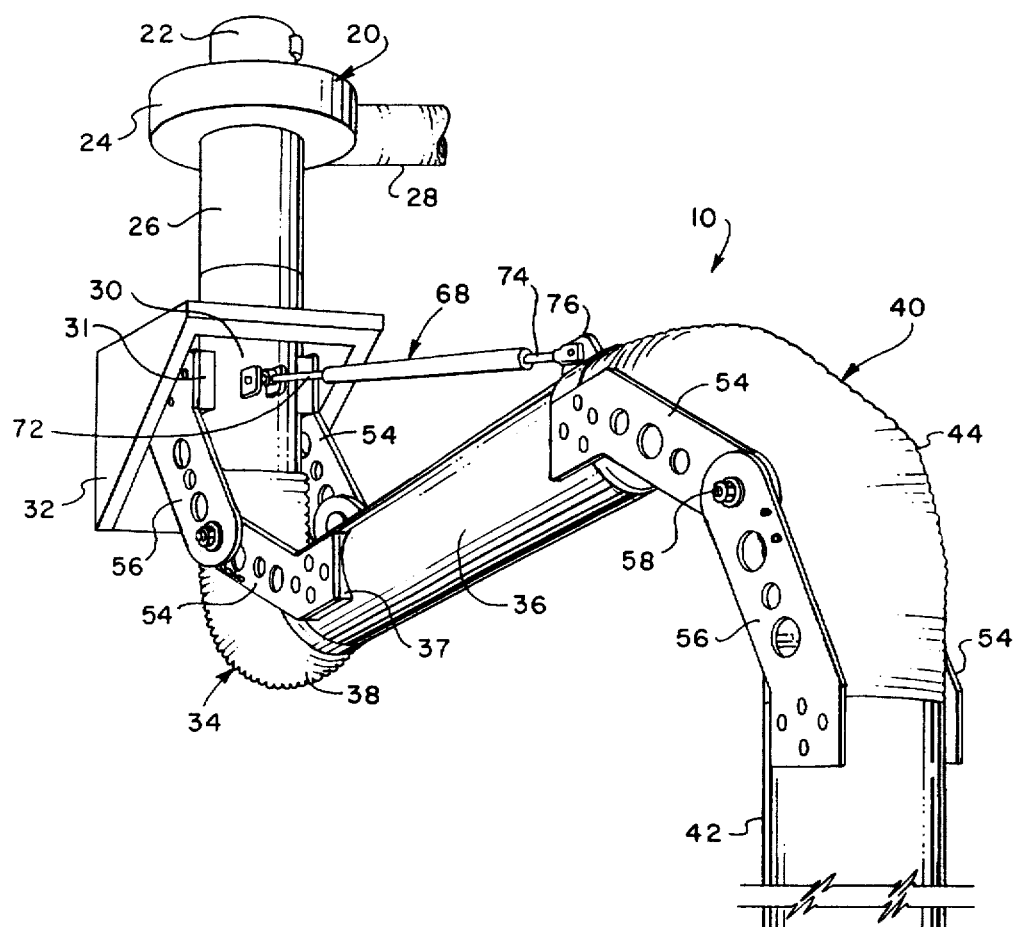
FIG. 1 is a perspective view of the articulated duct fume collection and exhaust apparatus of the invention in a working position.

In the description which follows, like parts are marked throughout the specification and drawings with the same reference numerals, respectively. The drawing figures may not all be to scale in the interest of clarity and conciseness.

Referring to FIG. 1, there is illustrated a perspective view of a unique fume collection and exhaust apparatus, generally designated by the numeral 10. The apparatus 10 is of a type which is adapted to collect fumes, mists, vapors, dust and other airborne particulates, such as might be generated by a thermal welding operation wherein a weld 12 is being formed between two plate elements 14, 16, shown by way of example. Accordingly, the apparatus 10 is provided with a generally frusto conical-shaped fume collection hood 18 which is in fluid flow communication with a suitable exhaust fan or suction pump, generally designated by the numeral 20. The pump 20 may be a centrifugal-type having a drive motor 22 directly coupled to an impeller (not shown) disposed within a shroud 24. The shroud 24 has an inlet duct portion 26 and an exhaust duct portion 28 connected thereto in a conventional manner. Other sources of exhaust or evacuation air flow may be utilized with the apparatus 10.

The apparatus 10 is further characterized by a first elongated, vertically extending rigid duct or tube section 30 which is directly coupled to the pump inlet duct 26 and is suitably supported by a joint support bracket 32 which may be attached to a vertical wall or to a portable console unit. The duct section 30 may be supported on the joint support bracket 32 for rotation about the longitudinal central axis of the duct section 30. A first flexible joint 34 is formed between the duct section 30 and a second elongated rigid duct section 36. The flexible joint 34 includes a flexible duct section 38 interconnecting the rigid duct sections 30, 36. The flexible duct section 38 may, for example, be formed of wire reinforced fabric having a tubular, pleated or accordion-like configuration which enables the duct section to be capable of universal bending while remaining substantially tubular in shape.

A second flexible joint 40 is provided in the apparatus 10 and connects the duct section 36 to a third substantially rigid tube type duct section 42. The joint 40 is also characterized by a section of wire reinforced flexible tube or duct 44 similar to the duct section 38. Lastly, the hood 18 is connected to the duct 42 by a flexible duct section 46 having the same structural features as the duct sections 38, 44. The hood 18 is advantageously connected to the duct 42 by a suitable universal joint 50, preferably disposed in the duct section 46, which enables the hood to be placed in a wide range of positions with respect to the duct 42 to gather air laden with fumes, mists and/or particulate material to be evacuated from a localized source by the apparatus 10.

It is necessary and desirable to provide support means at the joints 34 and 40 to at least aid in supporting that portion of the apparatus 10 distal of the respective joints. Rather precise and firm placement of the hood 18 is also important to provide for collection of particularly noxious fumes and particulate matter from rather small source areas such as the welding operation illustrated in FIG. 1. Accordingly, it is important to be able to move the apparatus 10, that is the hood 18 with respect to the wall bracket 32, to position the hood in such a way that it will be disposed precisely and firmly where the operator of the work being exhausted wants the hood. At the same time, the operator may want to move the hood 18 quickly away from a fume collection position, at will. In this regard, the apparatus 10 includes unique joint support mechanism for the joints 34 and 40 which provide a substantial part or all of the support for the apparatus distal of the respective joints, permit the precise and steady or firm positioning of the hood 18 in a desired working position, but also allow the hood to be moved quickly and easily to another position without substantial effort. In fact, the improved apparatus 10 allows for movement of the hood 18 between substantially all working and non-working positions with improved ease of movement and precise placement of the hood where desired.

The flexible joints 34, 40 are each provided with a joint support mechanism which will now be described primarily in conjunction with drawing FIGS. 2-6. Each of the joints 34, 40 is provided with a joint support mechanism which uses a substantial number of common parts for each joint. A minor modification to the support mechanism is required for controlling the desired movement of the joint 40 versus movement of the joint 34. Accordingly, referring primarily to the mechanism for the flexible joint 40 for a detailed description, the joint support mechanism for the joint 40 includes two interconnected support arms comprising plates 54, 56 which are pivotally connected at 58. The plates 54, 56 are suitably fastened at their distal ends, respectively, to support brackets 60, 62, FIG. 4, which are disposed on the tubes 36, 42, respectively.

Figure 4:
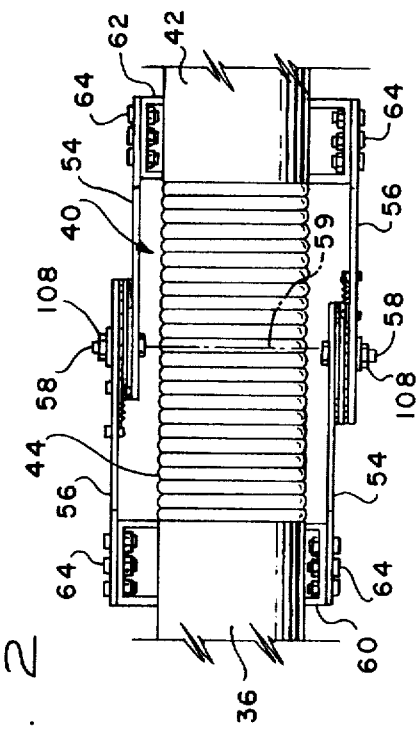
FIG. 4 is a plan view of the joint support mechanism shown in FIG. 3.
Figure 3:
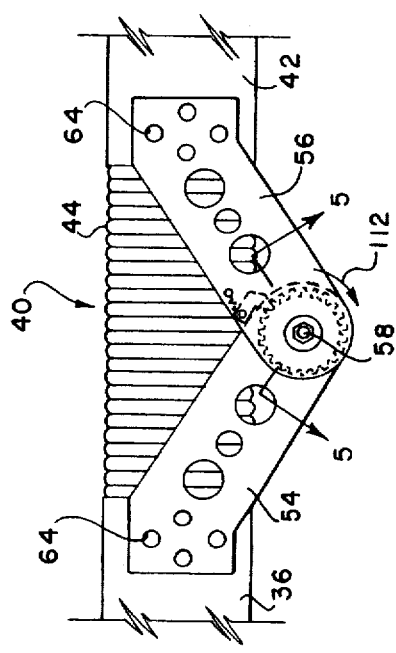
FIG. 3 is a detail side elevation view of one of the joint support mechanisms of the apparatus.

Viewing FIGS. 3 and 4, for example, the arrangement of the support plates 54, 56 together with the pivot connection 58, is such that the assembly of two plates 54, 56 and their pivot connection 58 may be turned end-for-end to provide support for the joint 40 on the side opposite that which is viewed in FIG. 3. Accordingly, as shown in FIG. 4, a plate 54 on one side is opposite a plate 56 on the other side of the joint 40 whereas the pivots 58 are aligned with each other along a transverse axis 59, FIG. 5. Each of the plates 54, 56 may be suitably connected to the brackets 60, 62 by suitable threaded fasteners 64, for example.

The joint support mechanism for the flexible joint 34 is similar to the mechanism for the flexible joint 40. Support plates 54, 56 are interconnected at a pivot connection 58 and are arranged on opposite sides of the flexible duct section 38 in a manner similar to the arrangement for the joint 40. The respective plate-like arms 54 and 56 of the mechanism for joint 34 are fastened to the duct sections 30 and 36 at respective support brackets 31 and 37, FIG. 1, for example. However, as will be described in further detail herein, a minor modification to the support mechanism is made for the arrangement used for the joint 34 to provide the desired movement characteristics of the apparatus 10.

In order to provide for relative ease of movement of the hood 18 into its working position, the joint support mechanisms for the joints 34, 40 are configured such that they substantially support the weight of structure which is distal of the respective joints in the direction of the hood 18. For example, the joint support mechanism provided by the opposed sets of plates 54, 56 at the flexible joint 34 desirably supports the structure comprising the tube 36, the joint 40, the tube 42, the joint 50 and the hood 18. Some support assistance may be required or is desirable at joint 34 from an additional feature of the invention as will be described hereinbelow.

In like manner, the joint support mechanism for the joint 40 is desirably operable to support the tube 42, the joint 50 and the hood 18. Moreover, when the joints 34, 40 are bent to a particular working (or non-working) position of the hood 18, it is desired that they remain firmly in that position but be easily moved away from the first mentioned position with only the weight of the fume collection apparatus itself being required to be overcome if an operator moves the hood 18, upwardly, viewing FIG. 1, for example. In other words, if the operator moves the hood 18 in such a way that only flexing of the joint 40 is required, then the operator should be required only to overcome the weight and moment of the tube 42, the joint 50, and the hood 18 when moving it to a working or non-working position in a direction which opposes gravity forces acting on the apparatus. Once the operator has raised the hood 18 to a selected position, the joint support mechanism for the joint 40 should be able to hold the hood in that new position. By the same token, the joint support mechanism should be capable of allowing the operator to return the hood 18 to the first mentioned position with precise and positive placement but without substantial effort.

The joint support mechanisms comprising the pivotally connected plates 54, 56 arranged on opposite sides of the joints 34, 40, for example, provide this improved type of movement of the apparatus 10. However, since the weight of the apparatus 10 which is distal of the joint 34 may be substantial for certain lengths of the duct sections 36 and 42, for example, some additional support assistance may be provided by opposed co-extensive support means 68, one shown in FIGS. 1 and 2, which are interconnected between the support plates for the joint 34 and the tube 36, as shown. The support means 68 may be conventional tension coil springs or conventional so-called "gas spring" mechanisms of a type commercially available.

The support means 68 operate to counterbalance at least some of the weight of the components of the apparatus 10 which are unsupported and are distal of the flexible joint 34. The illustrated embodiment of the support means 68 comprises gas spring assembly having a cylinder 70 connected to rods 72, 74 which are pivotally coupled to the duct section 30 and the support plate 54, respectively. The rods 72, 74 are extendable and retractable relative to the cylinder 70, and are biased for retraction movement which counterbalances the weight of the depending apparatus.

The unique joint support mechanism provided by the opposed sets of interconnected support plates 54, 56 will now be described in further detail in conjunction with FIGS. 5 and 6. The pivot connection 58 is characterized by a pivot pin in the form of a threaded bolt 79 having a hexagonal head 80, a non-threaded shank portion 82 adjacent the head and a distal threaded shank portion 84. The bolt head 80 has an integral flange or washer part 86 provided with a suitable key 88 which projects into a keyway 90 formed in the plate 54, FIG. 5, to prevent rotation of the bolt with respect to the plate 54. A generally planar, cylindrical clutch disk 92 is loosely journalled on the bolt shank portion 82 and between the plates 54, 56. The clutch disk 92 is formed of a suitable clutch disk material such as a non-metallic composite having grains of a suitable metallic or non-metallic bearing material interspersed therein.

A cylindrical disk-like clutch plate and ratchet wheel member 94 is journalled on the bolt shank portion 82 and is rotatable relative thereto. The clutch plate member 94 has a cylindrical hub 96 which projects through a bore 98 in the plate 56 and has a transverse face 100 which is dimensioned to stand off from the surface 102 of the plate 56. In other words, the axial length of the hub 96 projecting from the clutch plate member 94 is greater than the thickness of the plate 56. The hub 96 may be formed integrally with the clutch plate member 94 or as a separate element which, as shown, is secured to the clutch plate member 94 by an interference fit, for example. Moreover, the disk 92 may be secured non-rotatably to the plate member 94 or the plate member 94 may be provided with a suitable clutch facing or coating similar to the disk 92.

The plate members 54, 56 together with the clutch elements or members 92, 94 are held in assembly by the bolt 79, a friction washer 104, a back-up washer 106 and a prevailing torque nut 108 threaded over the bolt shank part 84. The washer 104 may be made of a suitable friction material similar to that used for the clutch disk 92, for example. Accordingly, by adjusting the position of the nut 108 on the bolt shank 82, 84, the axial pressure between the clutch plate member 94, the clutch disk 92 and plate 54 may be adjusted as desired. Rotation of the member 94 relative to the plate member 54 may, thus, require overcoming the selected friction forces between the members 92 and 54 or between the members 92 and 94. Accordingly, a friction slip clutch is formed between the members 94 and 54, including the clutch disk 92.

The clutch plate member 94 may be keyed to the plate 56 for movement in one direction of rotation about the axis 59 only when a force which exceeds the holding force of the clutch disk 92 is overcome. In the arrangement of the flexible joint 40, for example, movement of the plate 56 relative to the plate 54, in the direction of the arrow 112, FIG. 3, requires overcoming the friction holding force of the clutch provided by the members 94, 92 and the plate 54. Rotation of the plate 56 in the opposite direction relative to the plate 54 may be substantially unrestricted thanks to the mechanism shown in FIGS. 5 and 6, and further described hereinbelow.

Figure 5:
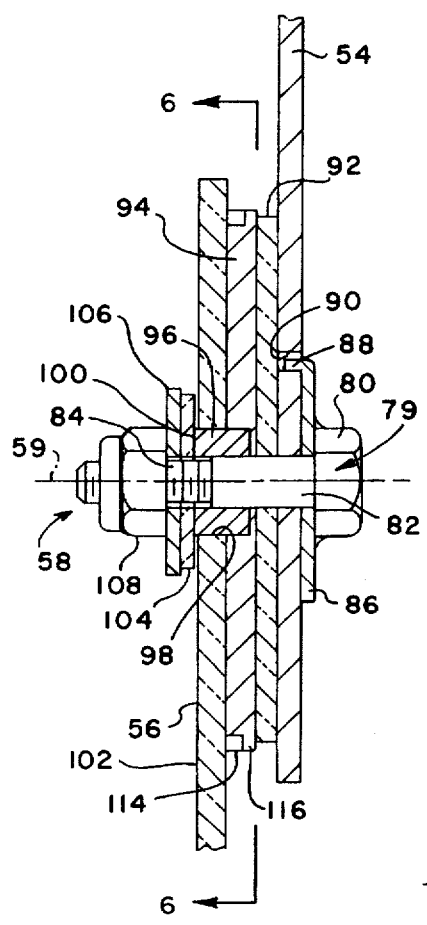
FIG. 5 is a section view taken generally along the line 5—5 of FIG. 3.
Figure 6:
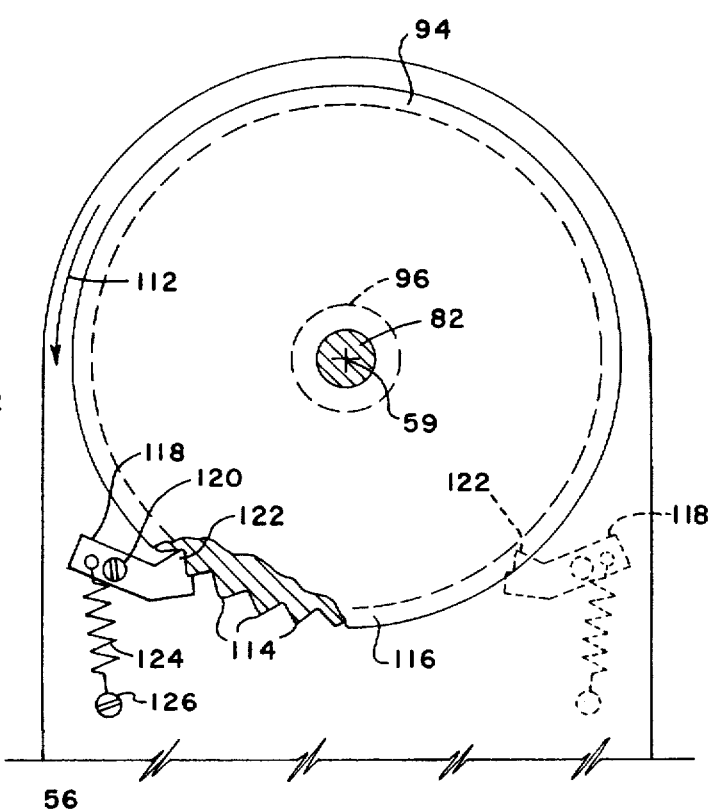
FIG. 6 is a detail view of the ratchet and pawl of the clutch mechanism taken along line 6—6 of FIG. 5.

Referring further to FIGS. 5 and 6, the clutch plate member 94 is provided with a set of ratchet teeth 114 which are suitably spaced apart around the periphery of the plate member 94 and are delimited on one side by a flange 116. A ratchet member 118 is pivotally supported on the plate 56 about a pivot member 120 and is spring biased to have a pawl 122 engaged with the teeth 114. A suitable tension spring 124 is supported at one end at a connection 126 to the plate 56 and is operably connected at its other end to the ratchet member 118. When the plate 56 is rotated in the direction of the arrow 112, FIGS. 3 and 6, relative to the plate 94, the pawl 122 forcibly engages a ratchet tooth 114 and rotates the clutch plate member 94 with the plate 56.

Figure 2:
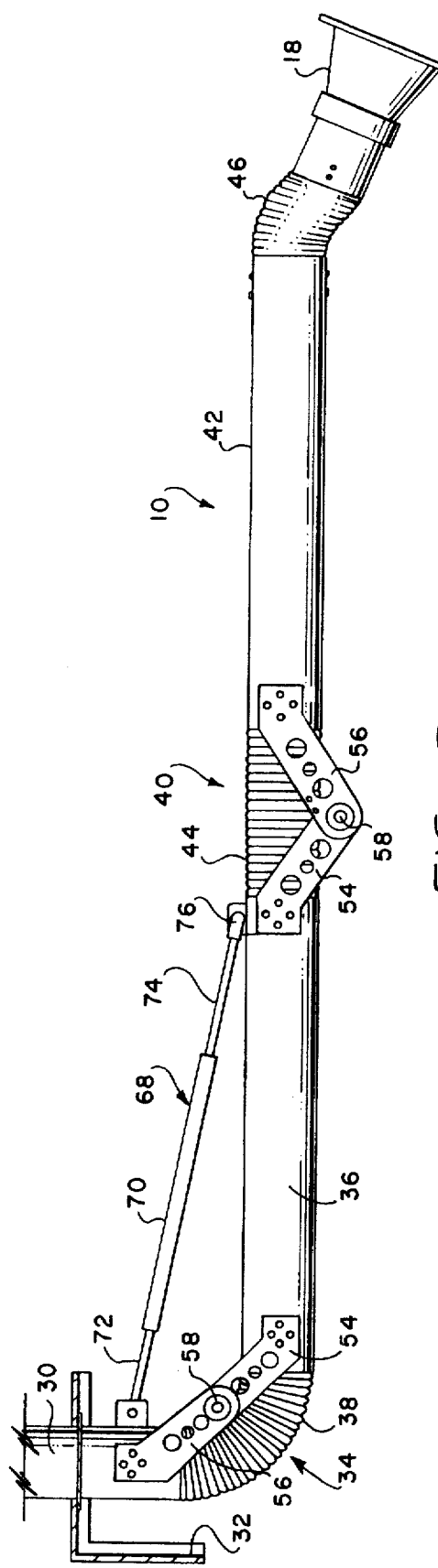
FIG. 2 is a side elevation of the apparatus shown in FIG. 1.

By this arrangement, when the hood 18 is moved downward, from the positions shown in FIGS. 1 or 2, and the flexible joint 40 is bent in a somewhat clockwise direction, the friction forces between the clutch plate member 94, the disk 92 and the plate 54 must be overcome to move the hood 18. These forces are mitigated by the weight of the apparatus 10 distal of the joint 40 and the associated torque exerted on the joint support mechanism. By adjusting the friction force necessary to slip the clutch disk 92 by tightening the nut 108, this force may be selected to be slightly more than is required to support the weight of the hood 18, the joint 52 and the tube 42 by an amount which will give the operator of the apparatus 10 precise and positive control over positioning of the hood 18.

The bolts 79 forming the pivot connections 58 at the joint 40 are conveniently arranged so that the nuts 108 may be accessed from the outer sides of the joint, as shown in FIG. 4, to provide for easy adjustment of the friction force setting of the aforementioned friction clutches. Of course, if it is desired to move the flexible joint 40 in a direction opposite to the direction of the arrow 112, the ratchet member 118 will slip over the crowns of the ratchet teeth 114 to allow substantially unrestricted pivotal movement of the flexible joint 40 in a counterclockwise direction, viewing FIGS. 1 and 2. In this way the operator of the apparatus 10 may be required to only exert a force at the joint 40, which overcomes the weight of the tube 42, the joint 50 and the hood 18.

The joint support mechanism for the joints 34 and 40 may be formed of substantially identical parts wherein opposed sets of plates 54, 56 and the associated clutch mechanism shown in FIGS. 5 and 6 may make up a support mechanism for one joint. In other words, an assembly of a plate 54, 56 on one side is duplicated and turned end-for-end to form the joint support mechanism on the other side for the joint 40. The joint 34 is normally bent in a direction opposite to that of the normal range of movement of the joint 40, viewing FIG. 1. Accordingly, to utilize the joint support mechanism comprising the plates 54, 56 and the associated clutch parts described above for the joint 40, the ratchet member 118 is moved to an alternate position on the plate 56, as shown in FIG. 6 by the alternate position lines. By this method, movement of the joint support mechanism for the joint 34 will operate such as to overcome the forces of the friction clutch of the joint support mechanism when the joint 34 is rotated in a somewhat clockwise direction, viewing FIG. 2, from a bent or curved position toward an unbent position and the ratchet and pawl coupling will allow substantially unrestricted rotation of the joint 34 in the opposite (vertical) direction in response to a force which is only substantially that necessary to overcome the unsupported weight of the apparatus. The retaining and adjustment nuts 108 of the clutch mechanisms and the gas springs 68 may be adjusted to counterbalance the additional weight and torque exerted on the joint support mechanism for the joint 34 resulting from the extended duct section 36 and the structure which is distal thereof.

In the arrangement of the apparatus 10, the joint support mechanisms described above for each of the flexible joints 34 and 40 are operable in such a way that, viewing FIGS. 1 or 2, if the hood 18 is moved in a generally clockwise direction about the support bracket 32, the friction clutches of each of the joint support mechanisms are operable to slip to allow pivotal movement of the joints 34 and 40. In this way, precise and positive control over movement and positioning of the hood 18 may be obtained. On the other hand, if it is desired to pivot the hood 18 and the duct section 42 in a counterclockwise direction relative to the duct section 36 and the bracket 32, the ratchet and pawl coupling arrangement described above will be operable to allow relatively free rotation or pivotal movement of the flexible joint 40 so that substantially only the weight of the duct section 42, the joint 50 and the hood 18 must be overcome to move that portion of the apparatus 10 relative to the duct section 36 and the joint 34. Of course, if additional movement is required, then the entire apparatus which is distal of the flexible joint 34 may be moved relative to the duct section 30 and the support bracket 32 by a force which overcomes at least part of the weight of those distal components. In that regard, the support means 68 will operate to counterbalance some of the effort required to move the apparatus.

Those skilled in the art will appreciate from the foregoing description how the unique fume collection and exhaust apparatus in accordance with the present invention may be fabricated and used. The tubes or ducts 30, 36, 42 and the hood 18 may be fabricated of suitable structural materials such as steel or aluminum. The flexible tubes or ducts 38, 44 and 46 may also be fabricated of conventional exhaust or air conducting duct material commercially available. The joint support mechanisms comprising the plates 54, 56, the clutch plate member 94 and the pivot connection 58 may also be formed of conventional materials such as steel or aluminum. As mentioned previously, the clutch disk 92 and the friction washer 104 may be formed of suitable friction clutch materials commonly used in friction clutch applications wherein minimal lubrication is required and these clutch members themselves may comprise self-lubricating materials.

Those skilled in the art will also appreciate that the apparatus 10 may be constructed using only one joint support assembly if only one flexible joint is required. Still further, the apparatus 10 may require more than two flexible joints.

While the exemplary embodiment is shown supported by a wall-mounted joint support bracket, the joint support bracket could also be mounted on a console unit when the fume collection and exhaust apparatus of the present invention is used in combination with a portable fume collector assembly.

Although a preferred embodiment of a unique fume and dust collection and exhaust apparatus has been described hereinabove in detail, those skilled in the art will recognize that various substitutions and modifications may be made to the invention without departing from the scope and spirit of the appended claims.

What is claimed is:

1. A fume collection and exhaust apparatus adapted for fluid communication with a vacuum source, said apparatus having one end constructed for attachment to a joint support bracket and the other end comprising a fume collection hood, said apparatus further comprising:

duct means for connecting said hood to a vacuum source, said duct means including a flexible duct section forming a flexible joint to permit movement of said hood with respect to the joint support bracket;

joint support mechanism at said flexible joint adapted to support at least part of the weight of said apparatus distal of said flexible joint, said joint support mechanism being movable in one direction relative to said flexible joint in response to a force exerted on said apparatus distal of said flexible joint for moving said hood to a first position, and said joint support mechanism being operable to permit movement of said hood to a second position through movement of said flexible joint in response to a force which overcomes the unsupported weight of said apparatus distal of said flexible joint, said joint support mechanism being operable to hold said apparatus distal of said flexible joint in said second position; and said joint support mechanism including friction clutch means operable to slip in response to a predetermined force exerted on said apparatus to bend said flexible joint in said one direction and means for effectively releasing said friction clutch means for relatively free movement of said flexible joint in the opposite direction.

2. The invention as set forth in claim 1 wherein:

said means for releasing said clutch means comprises a ratchet and pawl coupling mechanism associated with said joint support mechanism to permit said movement of said flexible joint in said opposite direction.

3. The invention as set forth in claim 2 wherein:

said joint support mechanism comprises at least two opposed arms pivotally connected to each other at said flexible joint to provide a pivot point of said flexible joint, one of said arms being connected to a first substantially rigid duct section on one side of said flexible joint and the other arm being connected to a second substantially rigid duct section on the other side of said flexible joint, and said pivot connection comprises means forming a pivot pin between said arms and associated with said friction clutch means to permit movement of one of said arms relative to the other of said arms in one direction in response to a force overcoming said friction clutch means.

4. The invention as set forth in claim 3 wherein:

said friction clutch means comprises clutch disk means disposed about said pivot connection and a clutch plate member disposed about said pivot connection and engaged with said disk means.

5. The invention as set forth in claim 4 wherein:

said clutch plate member includes a plurality of ratchet teeth disposed thereon and the other of said arms includes a ratchet pawl pivotally supported thereon and engageable with said teeth to prevent free rotation of said other arm relative to said one arm in one direction while providing for movement of said pawl relative to said teeth to permit movement of said other arm relative to said one arm in the opposite direction.

6. The invention as set forth in claim 5 including:

means for adjusting the force required to slip said friction clutch means.

7. The invention as set forth in claim 6 wherein:

said means for adjusting said force comprises a bolt forming said pivot pin between said arms, said bolt being adapted to support said arms for pivotal movement about the axis of said bolt and a nut threadedly engaged with said bolt and operable to exert a selective clutch engaging force on said friction clutch means.

8. The invention as set forth in claim 7 wherein:

said bolt includes key means engageable with said one arm to prevent rotation of said bolt relative to said one arm.

9. The invention as set forth in claim 8 wherein:

said nut comprises a prevailing torque nut to minimize unwanted rotation of said nut relative to said bolt.

10. The invention as set forth in claim 5 wherein:

said clutch plate member includes a hub rotatably supported on said pivot pin, said other arm being rotatably supported on said hub.

11. The invention as set forth in claim 5 wherein:

said disk means and said clutch plate member are disposed between said arms.

12. A fume collection and exhaust apparatus for collecting fumes and/or particulate material from a work area, said apparatus comprising:

a first substantially rigid duct section operably connected to a support bracket and in fluid communication with a vacuum source;

a flexible duct section connected to said first rigid duct section and to a second rigid duct section and forming a flexible joint, said second rigid duct section being operably connected to a fume collection hood which is positionable adjacent said work area;

joint support mechanism interconnecting said first and second rigid duct sections at said flexible joint to permit movement of said hood between first and second positions, said joint support mechanism comprising opposed sets of arms interconnecting said first and second rigid duct sections and being joined at respective pivot connections therebetween, respectively; and, friction clutch means associated with the pivot connections between said arms of said sets of arms operable to at least partially counterbalance the weight of said second rigid duct section and said hood and require exertion of a force on said apparatus distal of said flexible joint for positive positioning of said hood in response to moving said flexible joint in one direction and means for permitting movement of said flexible joint in the opposite direction by pivotal movement of one arm relative to the other arm of said sets of arms, respectively, with a force which is substantially only required to overcome the unsupported weight of said apparatus distal of said flexible joint.

13. The invention as set forth in claim 12 wherein:

said friction clutch means comprises clutch disk means disposed about said pivot connections and clutch plate members disposed about said pivot connections and engaged with said disk means, respectively.

14. The invention as set forth in claim 13 wherein:

said clutch plate member includes a plurality of ratchet teeth disposed thereon and one of said arms of a set of arms includes a ratchet pawl pivotally supported thereon and engageable with said teeth to prevent free rotation of one arm relative to the other arm in one direction while providing for movement of said pawl relative to said teeth to permit movement of said other arm relative to said one arm in the opposite direction.

15. A fume collection and exhaust apparatus comprising:

a first rigid duct section in fluid communication with a vacuum source and a support bracket connected to said first rigid duct section for supporting said apparatus;

a second rigid duct section connected to said first rigid duct section by a flexible joint including a first flexible duct section;

a third rigid duct section operably connected to said second rigid duct section by a second flexible joint including a second flexible duct section interconnecting said second and third rigid duct sections;

a fume collection hood in fluid flow communication with said third rigid duct section;

a first joint support mechanism associated with said first flexible joint comprising opposed sets of pivotally connected arms interconnecting said first rigid duct section with said second rigid duct section, friction clutch means interconnecting the arms of said sets of arms, respectively, and operable in response to a predetermined force exerted on said apparatus distal of said first flexible joint to permit movement of one arm of each set of arms relative to the other arm of each set of arms in one direction and ratchet means operable to permit relatively free movement of said one arm of each set of arms relative to the other arm of each set of arms in the opposite direction; and a second joint support mechanism associated with said second flexible joint comprising opposed sets of pivotally connected arms interconnecting said second rigid duct section and said third rigid duct section and friction clutch means interconnecting the arms of said sets of arms, respectively, of said second joint support mechanism for counterbalancing at least part of the weight of said third duct section and said hood and operable to provide for moving said hood in one direction and ratchet means associated with said second joint support mechanism operable to permit relatively free movement of said hood in the opposite direction of movement of said second flexible joint.

16. The invention as set forth in claim 15 wherein:

said apparatus includes support means for counterbalancing at least part of the weight of said apparatus distal of said first flexible joint, said support means including means interconnecting said first rigid duct section with said second rigid duct section.

17. The invention as set forth in claim 15 wherein:

said friction clutch means comprises means forming a clutch disk and a clutch plate member engaged with said disk and disposed about a pivot connection formed between said arms of said sets of arms, respectively.

18. The invention as set forth in claim 17 wherein:

said clutch plate member includes a plurality of ratchet teeth disposed thereon and one of said arms includes a ratchet pawl pivotally supported thereon and engageable with said teeth to prevent free rotation of said one arm relative to the other arm of a set of arms in one direction while providing for movement of said pawl relative to said teeth to permit movement of said other arm relative to said one arm in the opposite direction.

19. The invention as set forth in claim 17 including:

means for adjusting a clutch slipping force of said friction clutch means, respectively.

20. The invention as set forth in claim 19 wherein:

said means for adjusting said slipping force comprises a bolt forming a pivot pin between said arms of each set of arms, said bolt being adapted to support said arms for pivotal movement about the axis of said bolt and a nut threadedly engaged with said bolt and operable to exert a selective clutch slipping force on said friction clutch means, said nut being operable to retain said arms in assembly with said bolt.

21. The invention as set forth in claim 20 wherein:

said bolt includes key means engageable with one of said arms to prevent rotation of said bolt relative to said one arm.

22. The invention as set forth in claim 21 wherein:

said nut includes means operable to minimize unwanted rotation of said nut relative to said bolt.

* * * * *